(12) United States Patent
Mohtadi et al.

(10) Patent No.: US 9,312,566 B2
(45) Date of Patent: Apr. 12, 2016

(54) MAGNESIUM BOROHYDRIDE AND ITS DERIVATIVES AS MAGNESIUM ION TRANSFER MEDIA

(71) Applicant: Toyota Motor Engineering & Manufacturing North America, Inc., Erlanger, KY (US)

(72) Inventors: Rana F. Mohtadi, Northville, MI (US); Masaki Matsui, Tsu (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 483 days.

(21) Appl. No.: 13/720,522

(22) Filed: Dec. 19, 2012

(65) Prior Publication Data

US 2014/0038061 A1    Feb. 6, 2014

Related U.S. Application Data

(60) Provisional application No. 61/678,672, filed on Aug. 2, 2012.

(51) Int. Cl.
| | |
|---|---|
| *H01M 10/0566* | (2010.01) |
| *H01M 10/054* | (2010.01) |
| *H01M 4/38* | (2006.01) |
| *H01M 10/0567* | (2010.01) |
| *H01M 10/0568* | (2010.01) |
| *H01M 10/0569* | (2010.01) |

(52) U.S. Cl.
CPC .......... *H01M 10/0566* (2013.01); *H01M 4/381* (2013.01); *H01M 10/054* (2013.01); *H01M 10/0567* (2013.01); *H01M 10/0568* (2013.01); *H01M 10/0569* (2013.01); *H01M 2300/002* (2013.01)

(58) Field of Classification Search
CPC ................. H01M 10/054; H01M 10/0566
See application file for complete search history.

(56) References Cited

U.S. PATENT DOCUMENTS

| | | | | |
|---|---|---|---|---|
| 4,397,925 | A | * | 8/1983 | Magahed ................. 429/207 |
| 4,808,282 | A | * | 2/1989 | Gregory ................... 205/420 |
| 6,316,141 | B1 | | 11/2001 | Aurbach et al. |
| 6,383,688 | B1 | * | 5/2002 | Inagaki et al. ............ 429/322 |
| 2002/0110739 | A1 | * | 8/2002 | McEwen et al. .......... 429/324 |
| 2005/0016840 | A1 | | 1/2005 | Petillo |
| 2007/0048605 | A1 | | 3/2007 | Pez et al. |
| 2009/0029206 | A1 | | 1/2009 | Jung et al. |
| 2010/0141211 | A1 | | 6/2010 | Yazami |
| 2011/0076572 | A1 | | 3/2011 | Amine et al. |
| 2011/0117440 | A1 | | 5/2011 | Maekawa et al. |

* cited by examiner

*Primary Examiner* — Jeremiah Smith
(74) *Attorney, Agent, or Firm* — Dinsmore & Shohl LLP

(57) ABSTRACT

The electrolyte includes a magnesium salt having the formula $Mg(BX_4)_2$ where X is selected from H, F and O-alkyl. The electrolyte also includes a solvent, the magnesium salt being dissolved in the solvent. Various solvents including aprotic solvents and molten salts such as ionic liquids may be utilized.

18 Claims, 4 Drawing Sheets

MAGNESIUM BOROHYDRIDE AND ITS DERIVATIVES AS MAGNESIUM ION TRANSFER MEDIA

CROSS-REFERENCE TO RELATED APPLICATIONS

This application claims priority of U.S. Provisional Patent Application Ser. No. 61/678,672, filed Aug. 2, 2012, the entire contents of which are incorporated herein by reference.

FIELD OF THE INVENTION

The invention relates to electrolytes and more particularly to electrolytes for magnesium batteries.

BACKGROUND OF THE INVENTION

Rechargeable batteries, such as lithium-ion batteries, have numerous commercial applications. Capacity density is an important characteristic, and higher capacity densities are desirable for a variety of applications.

A magnesium ion in a magnesium or magnesium-ion battery carries two electrical charges, in contrast to the single charge of a lithium ion. Improved electrolyte materials would be very useful in order to develop high capacity density batteries.

Current state of the art electrolytes for magnesium batteries may use organomagnesium salts and complexes as they are the only ones known to be compatible with an Mg anode allowing for reversible electrochemical Mg deposition and stripping. However, such materials may be corrosive and may be difficult to utilize in a battery. Conventional inorganic and ionic salts such as $Mg(ClO_4)_2$ may be incompatible with the Mg anode due to the formation of an ion-blocking layer formed by their electrochemical reduction.

There is therefore a need in the art for an improved electrolyte that solves the problems of the prior art and provides a stable rechargeable Mg battery system. There is a further need in the art for an electrolyte that allows reversible Mg deposition and stripping in a chloride-free inorganic salt. There is also a need in the art for an improved battery having increased current densities and high coulombic efficiencies.

SUMMARY OF THE INVENTION

In one aspect, there is disclosed an electrolyte for a magnesium battery. The electrolyte includes a magnesium salt having the formula $Mg(BX_4)_2$ where X is selected from H, F and O-alkyl. The electrolyte also includes a solvent, the magnesium salt being dissolved in the solvent. Various solvents including aprotic solvents and molten salts such as ionic liquids may be utilized.

In another aspect, there is disclosed an electrolyte for a magnesium battery. The electrolyte includes a magnesium salt having the formula $Mg(B_xH_y)_z$ where X=3-12, y=8-12 and z=1-2. The electrolyte also includes a solvent, the magnesium salt being dissolved in the solvent. Various solvents including aprotic solvents and molten salts such as ionic liquids may be utilized.

In a further aspect, there is disclosed a magnesium battery that includes a magnesium metal containing anode. The battery also includes an electrolyte including a magnesium salt having the formula $Mg(BX_4)_2$ where X is selected from H, F and O-alkyl. The electrolyte also includes a solvent. The magnesium salt being dissolved in the solvent. The battery also includes a cathode separated from the anode. Magnesium cations are reversibly stripped and deposited between the anode and cathode.

In yet another aspect, there is disclosed a magnesium battery that includes a magnesium metal containing anode. The battery also includes an electrolyte including a magnesium salt having the formula $Mg(B_xH_y)_z$ where X=3-12, y=8-12 and z=1-2. The electrolyte also includes a solvent. The magnesium salt being dissolved in the solvent. The battery also includes a cathode separated from the anode. Magnesium cations are reversibly stripped and deposited between the anode and cathode.

DETAILED DESCRIPTION OF THE PREFERRED EMBODIMENTS

Figure 1:
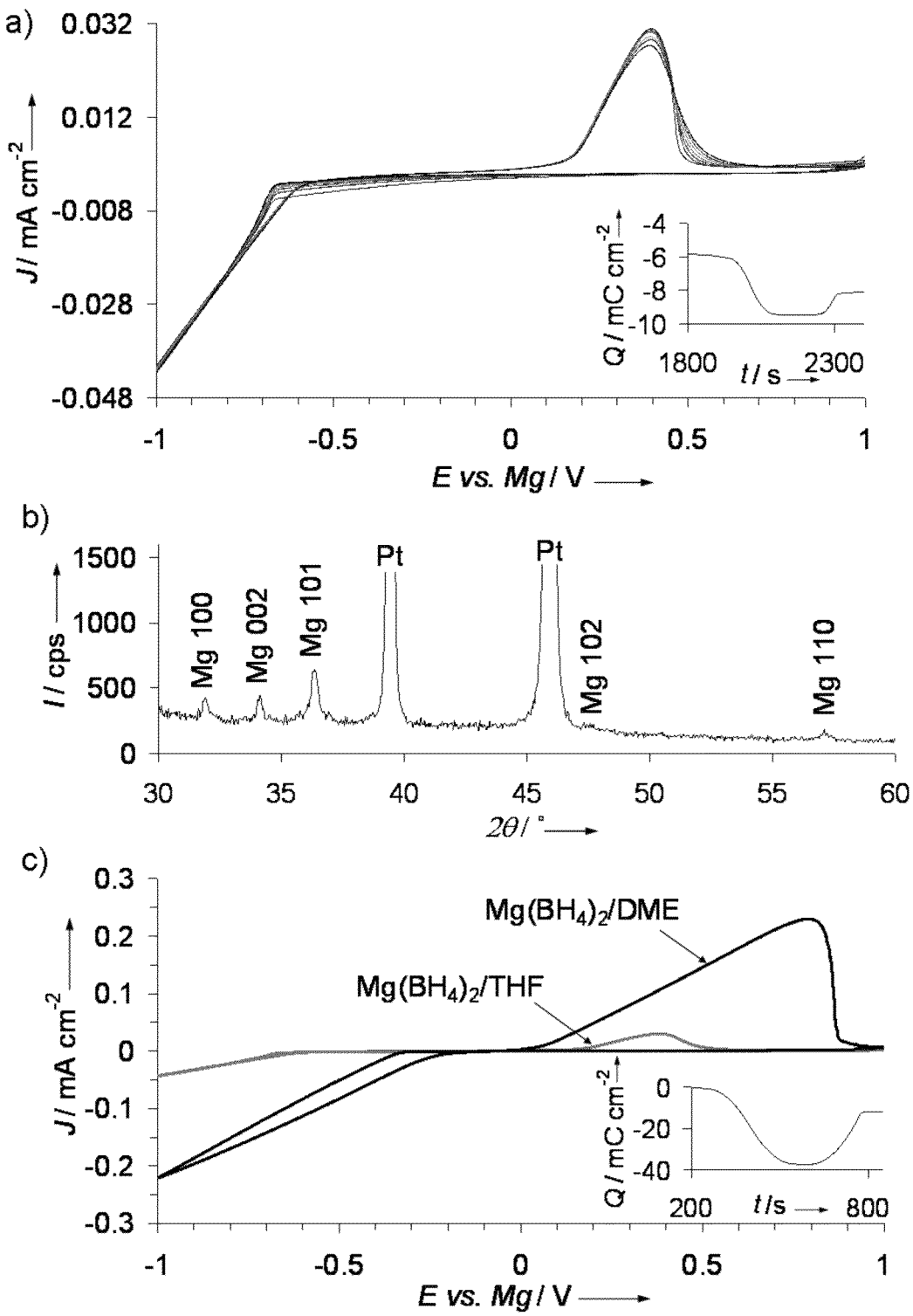
FIG. 1 is a diagram of 0.5 M $Mg(BH_4)_2$/THF showing a) Cyclic voltammetry (8 cycles) with the inset showing deposition/stripping charge balance ($3^{rd}$ cycle) b) XRD results following galvanostatic deposition of Mg on a Pt working electrode, c) Cyclic voltammetry for 0.1 M $Mg(BH_4)_2$/DME compared to 0.5 M $Mg(BH_4)_2$/THF with the inset showing deposition/stripping charge balance for $Mg(BH_4)_2$/DME.

There is disclosed a novel electrolyte for an Mg battery. The novel electrolyte allows electrochemical reversible Mg deposition and stripping in a halide-free inorganic salt.

In a first aspect the novel electrolyte may include a magnesium salt having the formula $Mg(BX_4)_2$ where X is selected from H, F and O-alkyl. The magnesium salt is dissolved in the solvent. Various solvents including aprotic solvents and molten salts such as ionic liquids may be utilized. Aprotic solvents may include, for example solvents such as tetrahydrofuran (THF) and dimethoxyethane (DME). Other examples of aprotic solvents include: dioxane, triethyl amine, diisopropyl ether, diethyl ether, t-butyl methyl ether (MTBE), 1,2-dimethoxyethane (glyme), 2-methoxyethyl ether (diglyme), tetraglyme, and polyethylene glycol dimethyl ether.

In one aspect, the magnesium salt may have a molarity of from 0.01 to 4 molar.

The electrolyte may further include a chelating agent. Various chelating agents including glymes and crown ethers may be utilized. The chelating agent may be included to increase the current and lower the over-potential of a battery that includes the electrolyte.

The electrolyte may further include acidic cation additives increasing the current density and providing a high coulombic efficiency. Examples of acidic cation additives include lithium borohydride, sodium borohydride and potassium borohydride. The acidic cation additives may be present in an amount of up to five times the amount in relation to $Mg(BX_4)_2$.

In another aspect the novel electrolyte may include a magnesium salt having the formula a magnesium salt having the formula $Mg(B_xH_y)_z$ where X=3-12, y=8-12 and z=1-2. The magnesium salt is dissolved in the solvent. Various solvents including aprotic solvents and molten salts such as ionic liquids may be utilized. Aprotic solvents may include, for example solvents such as tetrahydrofuran (THF) and dimethoxyethane (DME). In one aspect, the magnesium salt may have a molarity of from 0.01 to 4 molar.

The electrolyte may further include a chelating agent. Various chelating agents including monoglyme may be utilized. The chelating agent may be included to increase the current and lower the over-potential of a battery that includes the electrolyte.

The electrolyte may further include acidic cation additives increasing the current density and providing a high coulombic efficiency. Examples of acidic cation additives include lithium borohydride, sodium borohydride and potassium borohydride. The acidic cation additives may be present in an amount of up to five times the amount in relation to $Mg(B_xH_y)_z$.

In a further aspect, there is disclosed a magnesium battery that includes a magnesium metal containing anode, an electrolyte of either the formula: $Mg(B_xH_y)_z$ where X=3-12, y=8-12 and z=1-2 or $Mg(BX_4)_2$ where X is selected from H, F and O-alkyl and a cathode. The electrolyte may also include the chelating agents and acidic cation additives as described above.

The anode may include magnesium metal anodes. The cathode may include various materials that show an electrochemical reaction at a higher electrode potential than the anode. Examples of cathode materials include transition metal oxides, sulfides, fluorides, chlorides or sulphur and Chevrel phase materials such as $Mo_6S_8$. The battery includes magnesium cations that are reversibly stripped and deposited between the anode and cathode.

EXAMPLES

Magnesium borohydride ($Mg(BH_4)_2$,95%), lithium borohydride ($LiBH_4$,90%), anhydrous tetrahydrofuran (THF) and dimethoxyethane (DME) were purchased from Sigma-Aldrich. The various components were mixed to provide the specified molar electrolyte solutions. Cyclic voltammetry testing was conducted in a three-electrode cell with an Mg wire/ribbon as reference/counter electrodes. The electrochemical testing was conducted in an argon filled glove box with $O_2$ and $H_2O$ amounts kept below 0.1 ppm.

$Mg(BH_4)_2$ in THF

Mg deposition and stripping was performed for $Mg(BH_4)_2$ in ether solvents. FIG. 1a shows the cyclic voltammogram obtained for 0.5 M $Mg(BH_4)_2$/THF where a reversible reduction/oxidation process took place with onsets at −0.6 V/0.2 V and a 40% coulombic efficiency, as shown in FIG. 1a inset, indicating reversible Mg deposition and stripping. X-ray diffraction (XRD) of the deposited product following galvanostatic reduction from the above solution as shown in FIG. 1b denotes that the deposited product is hexagonal Mg. The deposition of the hexagonal magnesium demonstrates the compatibility of the electrolyte, $Mg(BH_4)_2$ with Mg metal. The electrochemical oxidative stabilities measured on platinum, stainless steel and glassy carbon electrodes were 1.7, 2.2 and 2.3 V, respectively. These results denote that $Mg(BH_4)_2$ is electrochemically active in THF such that ionic conduction and reversible magnesium deposition and stripping utilizing the electrolyte occurs.

$Mg(BH_4)_2$ in DME

In addition to ether solvents, another solvent, dimethoxyethane (DME) having a higher boiling temperature than THF was utilized. The cyclic voltammogram obtained for 0.1 M $Mg(BH_4)_2$/DME is shown in FIG. 1c. As can be seen in the Figure, there is an improvement in the electrochemical performance compared to $Mg(BH_4)_2$/THF. As seen in the Figure, there is a 10 fold increase in the current density and a reduction in the overpotential for deposition/stripping onsets at −0.34 V/0.03 V vs. −0.6 V/0.2 V in THF). Additionally, the DME solvent based electrolyte demonstrated a higher coulombic efficiency at 67% in comparison to 40% in THF. These findings indicate the presence of Mg electroactive species in higher concentration and mobility in DME despite the lower solubility of $Mg(BH_4)_2$ in DME versus THF.

Figure 2:
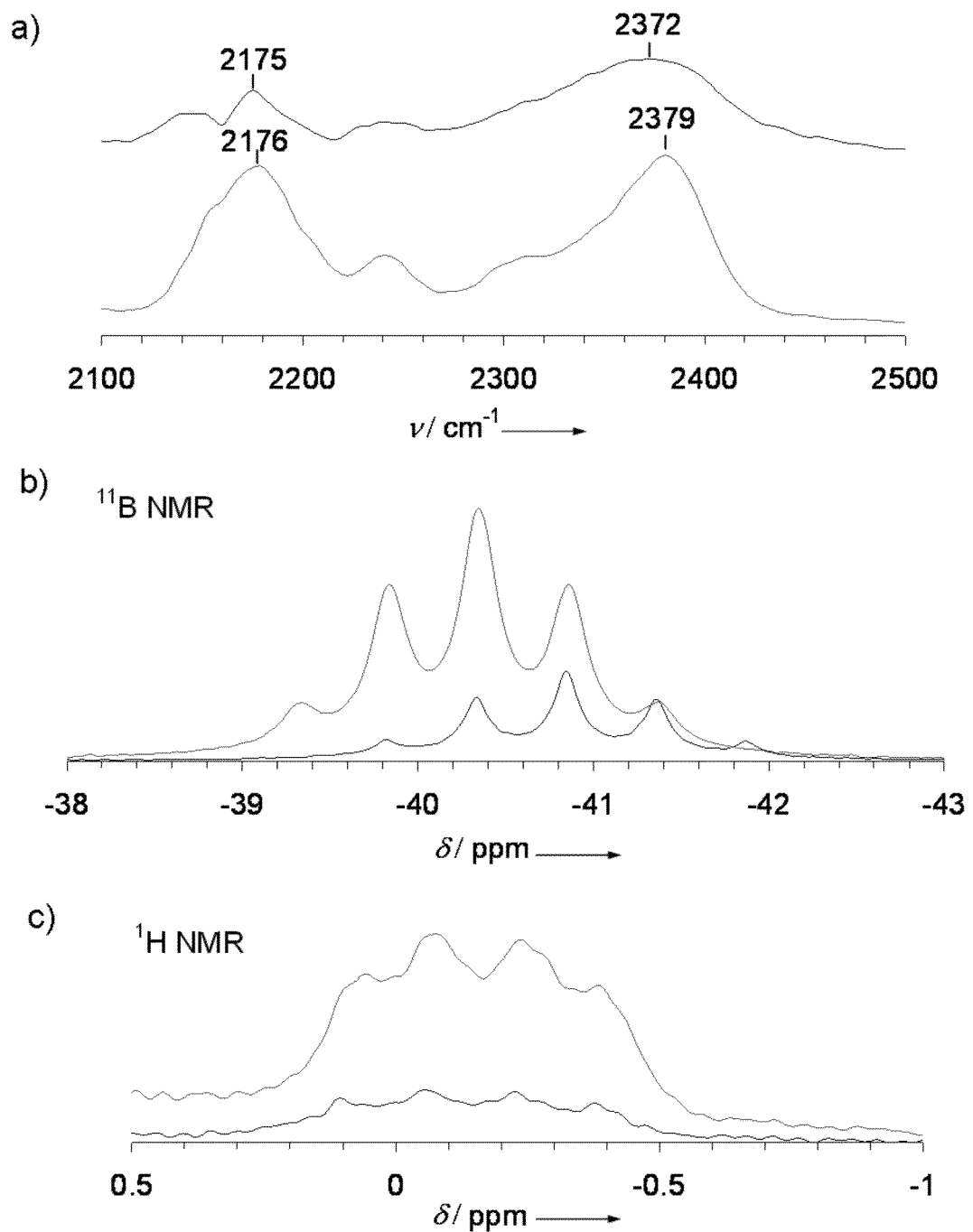
FIG. 2 is a diagram of $Mg(BH_4)_2$ in THF and DME: a) IR Spectra, b) $^{11}$B NMR, and c) $^1$H NMR.

IR and NMR spectroscopic analyses as shown in FIG. 2 were conducted for 0.5 M $Mg(BH_4)_2$/THF and 0.1 M $Mg(BH_4)_2$/DME to characterize the magnesium electroactive species. The IR B—H stretching region (2000-2500 cm$^{-1}$) reveals two strong widely separated vibrations ($Mg(BH_4)_2$/THF: 2379 cm$^{-1}$, 2176 cm$^{-1}$ and $Mg(BH_4)_2$/DME: 2372 cm$^{-1}$, 2175 cm$^{-1}$). The spectra for 0.1M DME and 0.5 M in THF are similar. The spectra are similar to covalent borohydrides and for $Mg(BH_4)_2$ solvates from THF and diethyl ether where 2 hydrogen atoms in $BH_4^-$ are bridge bonded to 1 metal atom ($\mu_2^1$ bonding). Therefore, we assigned the bands at the higher and lower B—H frequencies to terminal B—$H_t$ and bridging B—$H_b$ vibrations, respectively. The band and shoulder at 2304 and 2240 cm$^{-1}$ were assigned to asymmetric B—$H_t$ and B—$H_b$ vibrations, respectively. It is suggested that $Mg(BH_4)_2$ is present as the contact ion pair $Mg(\mu_2^1$-$H_2$—$BH_2)_2$ which partially dissociates into $Mg(\mu_2^1$-$H_2$—$BH_2)^+$ and $BH_4^-$ as in reaction (1). In one aspect, since the B—H peaks are likely overlapping, it is not possible to distinguish all the species.

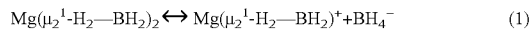

$$Mg(\mu_2^1\text{-}H_2\text{---}BH_2)_2 \leftrightarrow Mg(\mu_2^1\text{-}H_2\text{---}BH_2)^+ + BH_4^- \qquad (1)$$

Where $Mg(\mu_2^1$-$H_2$—$BH_2)^+$ may further dissociate:

$$Mg(\mu_2^1\text{-}H_2\text{---}BH_2)^+ \leftrightarrow Mg^{2+} + BH_4^- \qquad (2)$$

For $Mg(BH_4)_2$/DME, while the main features present in THF were retained, $vB$—$H_t$ broadening and shifting to lower values accompanied with relative weakening of $vB$—$H_b$ intensity was observed. While $vB$—$H_t$ broadening suggests a more pronounced presence of some species relative to that in THF, the band maximum shift indicates a more ionic B—H bond. The $vB$—$H_t$ shift is similar to those resulting from an enhanced $BH_4^-$ iconicity, such as in stabilized covalent borohydrides. In addition, the relative weakening in $vB$—$H_b$ intensity suggests a more pronounced presence of free $BH_4^-$ anion. The NMR results for $BH_4^-$ in DME, as shown in FIGS. 2b and 2c, display an increased boron shielding by about 0.5 ppm as denoted by the center position of quintet in $^{11}B$ NMR and slightly reduced proton shielding by about 0.01 ppm, as denoted by the quartet in $^1H$ NMR consistent with a higher B—H bond ionicity compared to that in THF. These results are evidence of weaker interactions between $Mg^{2+}$ and $BH_4^-$ within the ion pair and an enhanced dissociation in DME per reactions (1) and (2). So despite the fact that DME has a slightly lower dielectric constant (7.2) compared to THF (7.4), its chelation properties due to the presence of two oxygen sites per molecule resulted in an enhanced dissociation and thus an improved electrochemical performance.

$Mg(BH_4)_2$ and $LiBH_4$ in DME

Figure 3:
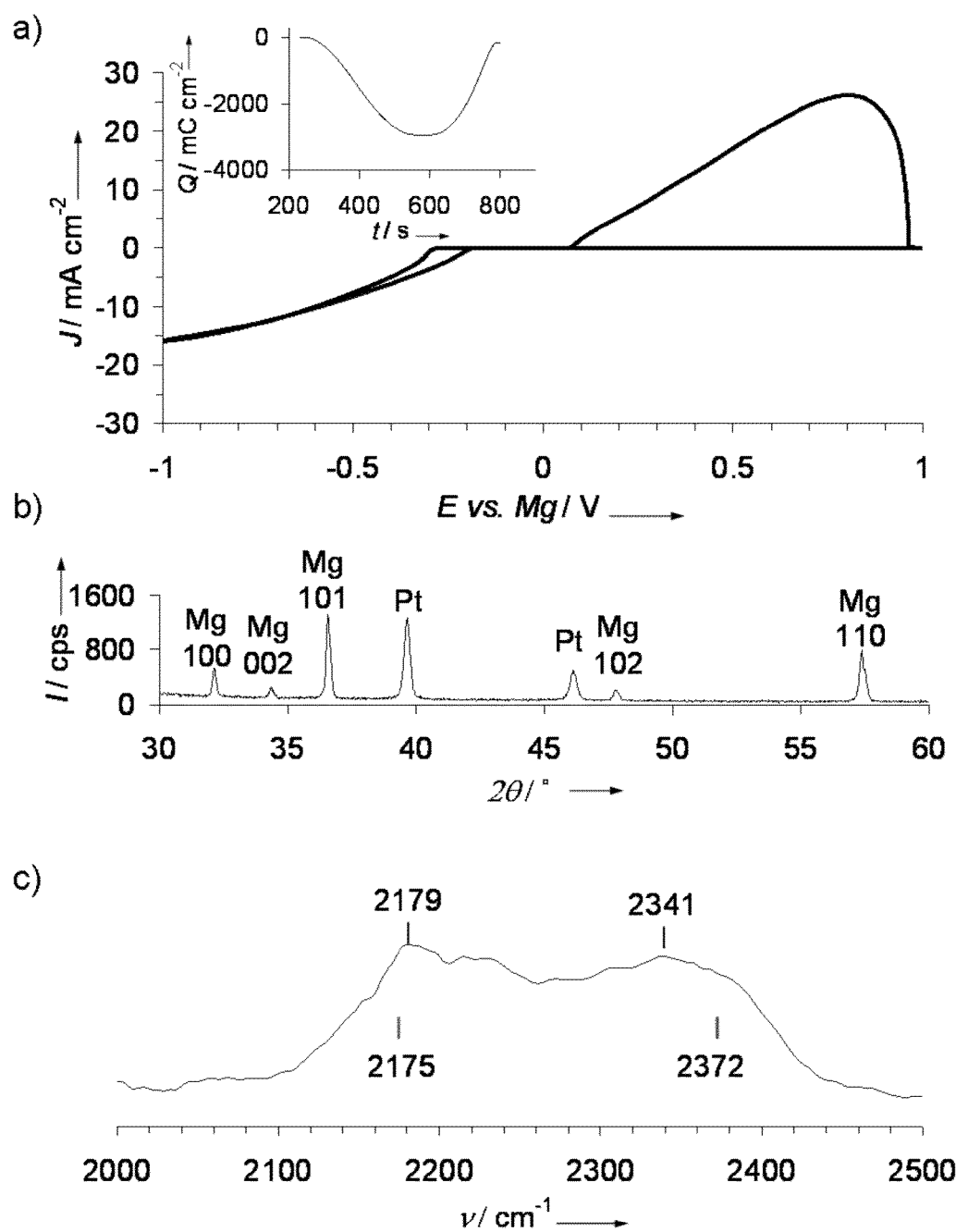
FIG. 3 is a diagram of $LiBH_4$ (0.6 M)/$Mg(BH_4)_2$ (0.18 M) in DME: a) cyclic voltammetry with the inset showing deposition/stripping charge balance, b) XRD results following galvanostatic deposition of Mg on a Pt disk and c) IR spectra (| indicates band maxima for $Mg(BH_4)_2$/DME)

As recited above, the electrolyte may include an acidic cation additive. In one aspect, the acidic cation additive may include the following characteristics: 1) a reductive stability comparable to $Mg(BH_4)_2$, 2) non-reactive, 3) halide free and 4) soluble in DME. One such material that includes these properties is $LiBH_4$. Mg deposition and stripping was performed in DME using various molar ratios of $LiBH_4$ to $Mg(BH_4)_2$. As shown in FIG. 3a cyclic voltammetry data was obtained for 3.3:1 molar $LiBH_4$ to $Mg(BH_4)_2$. Including the $LiBH_4$ material in the electrolyte increased by 2 orders of magnitude the current density as denoted by the oxidation peak current $Jp=26$ mA $cm^{-2}$. Additionally, the electrolyte had a higher coulombic efficiency of up to 94%.

Referring to FIG. 3b, the deposition and stripping currents are displayed for magnesium based on the absence of Li following galvanostatic deposition and also the lack of electrochemical activity in $LiBH_4$/DME solution. Enhanced $BH_4^-$ ionicity as shown in FIG. 3c displayed as lower $vB-H_t$ and higher $vB-H_b$ values were obtained. The enhanced properties indicate that the acidic cation additive increases $Mg(BH_4)_2$ dissociation as indicated by the B—H bands for $LiBH_4$/DME which occur at lower values.

Figure 4:
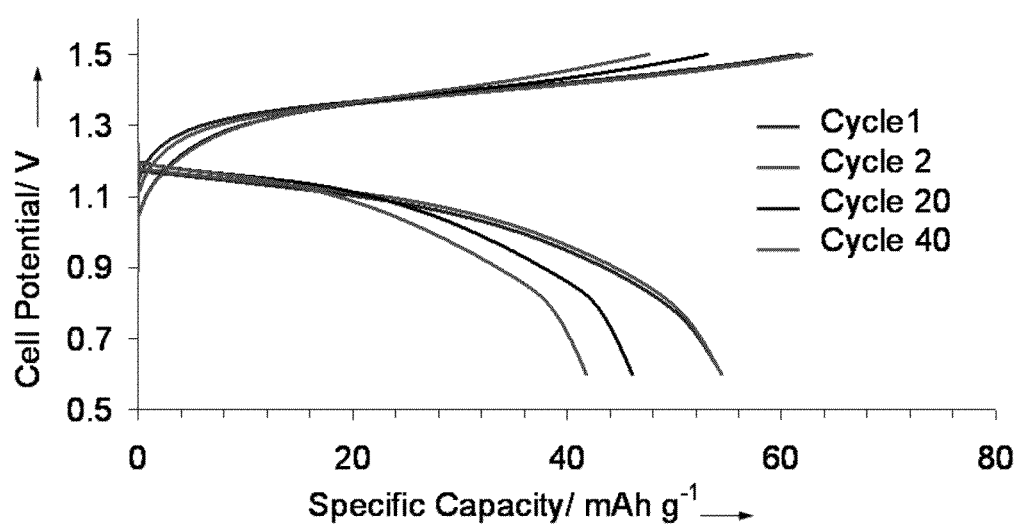
FIG. 4 is a diagram of Charge/discharge profiles with Mg anode/Chevrel phase cathode for 3.3:1 molar $LiBH_4$/Mg $(BH_4)_2$ in DME.

Magnesium Battery with Mg anode, Chevrel phase cathode and $Mg(BH_4)_2$ and $LiBH_4$ in DME A magnesium battery was tested using an electrolyte for 3.3:1 molar $LiBH_4$ to $Mg(BH_4)_2$. The cathode of the test battery included a cathode active material having a Chevrel phase $Mo_6S_8$. The anode for the test battery included an Mg metal anode. Referring to FIG. 4, the test battery demonstrated reversible cycling capabilities at a 128.8 mA $g^{-1}$ rate. As can be seen in the Figure, the charge and discharge curves indicate reversible cycling of a magnesium ion.

The invention is not restricted to the illustrative examples described above. Examples described are not intended to limit the scope of the invention. Changes therein, other combinations of elements, and other uses will occur to those skilled in the art.

The invention claimed is:

1. An anhydrous electrolyte for a magnesium battery comprising:
   a magnesium salt having the formula $Mg(BH_4)_2$ and optionally including $Mg(BX_4)_2$ where X is selected from F and O-alkyl;
   a solvent, the magnesium salt being dissolved in and stable in said solvent wherein the dissolved salt include the anion $BH_4^-$.

2. The electrolyte of claim 1 wherein the solvent is an aprotic solvent.

3. The electrolyte of claim 2 wherein the aprotic solvent is selected from: tetrahydrofuran (THF) and dimethoxyethane (DME).

4. The electrolyte of claim 1 wherein the solvent is an ionic liquid.

5. The electrolyte of claim 1 wherein the magnesium salt has a molarity of from 0.01 to 4 molar.

6. The electrolyte of claim 1 further including a chelating agent.

7. The electrolyte of claim 6 wherein the chelating agent includes monoglyme.

8. The electrolyte of claim 1 further including an acidic cation additive.

9. The electrolyte of claim 8 wherein the acidic cation additive is selected from: lithium borohydride, sodium borohydride and potassium borohydride.

10. A magnesium battery comprising:
    a magnesium metal containing anode;
    an anhydrous electrolyte including a magnesium salt having the formula $Mg(BX_4)_2$ where X is selected from H, F and O-alkyl and a solvent, the magnesium salt being dissolved in said solvent and stable in said solvent wherein the dissolved salt includes the anion $BH_4^-$;
    a cathode;
    wherein magnesium cations are reversibly stripped and deposited between the anode and cathode.

11. The magnesium battery of claim 10 wherein the solvent is an aprotic solvent.

12. The magnesium battery of claim 11 wherein the aprotic solvent is selected from: tetrahydrofuran (THF) and dimethoxyethane (DME).

13. The magnesium battery of claim 10 wherein the solvent is an ionic liquid.

14. The magnesium battery of claim 10 wherein the magnesium salt has a molarity of from 0.01 to 4 molar.

15. The magnesium battery of claim 10 further including a chelating agent.

16. The magnesium battery of claim 15 wherein the chelating agent includes monoglyme.

17. The magnesium battery of claim 10 further including an acidic cation additive.

18. The magnesium battery of claim 17 wherein the acidic cation additive is selected from: lithium borohydride, sodium borohydride and potassium borohydride.

* * * * *

UNITED STATES PATENT AND TRADEMARK OFFICE
CERTIFICATE OF CORRECTION

PATENT NO. : 9,312,566 B2
APPLICATION NO. : 13/720522
DATED : April 12, 2016
INVENTOR(S) : Rana F. Mohtadi and Masaki Matsui It is certified that error appears in the above-identified patent and that said Letters Patent is hereby corrected as shown below:

Specification

In Column 2, Lines 65 - 67, after "may include", delete "a magnesium salt having the formula a magnesium salt having the formula" and insert --a magnesium salt having the formula--, therefor.

Signed and Sealed this
Thirty-first Day of May, 2016

Michelle K. Lee
*Director of the United States Patent and Trademark Office*